United States Patent
Yang et al.

(10) Patent No.: US 7,992,046 B2
(45) Date of Patent: Aug. 2, 2011

(54) TEST SYSTEM WITH SIMULATION CONTROL DEVICE FOR TESTING FUNCTIONS OF ELECTRONIC DEVICES

(75) Inventors: Su-Kuang Yang, Taipei Hsien (TW); Chien-Hung Lo, Taipei Hsien (TW); Min-Fu Deng, Shenzhen (CN); Zheng-Quan Peng, Shenzhen (CN); Xiang Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 264 days.

(21) Appl. No.: 12/329,617

(22) Filed: Dec. 7, 2008

(65) Prior Publication Data

US 2010/0017658 A1    Jan. 21, 2010

(30) Foreign Application Priority Data

Jul. 21, 2008    (CN) .......................... 2008 1 0302864

(51) Int. Cl.
*G06F 11/00* (2006.01)
*G06F 11/26* (2006.01)
(52) U.S. Cl. .............. 714/38.1; 714/28; 714/40; 703/25
(58) Field of Classification Search .................... 714/28, 714/38, 40, 38.1; 703/23, 24, 25
See application file for complete search history.

(56) References Cited

U.S. PATENT DOCUMENTS

| | | | | |
|---|---|---|---|---|
| 5,157,782 A * | 10/1992 | Tuttle et al. | ..................... | 714/45 |
| 5,233,611 A * | 8/1993 | Triantafyllos et al. | .......... | 714/46 |
| 5,781,720 A * | 7/1998 | Parker et al. | .................... | 714/38 |
| 6,058,493 A * | 5/2000 | Talley | ......................... | 714/38.1 |
| 6,804,796 B2 * | 10/2004 | Gustavsson et al. | ......... | 714/38.1 |
| 7,055,137 B2 * | 5/2006 | Mathews | ...................... | 717/125 |
| 7,162,406 B1 * | 1/2007 | Dye | .............................. | 703/21 |
| 7,272,750 B2 * | 9/2007 | Sirbu | ........................... | 714/26 |
| 7,644,316 B2 * | 1/2010 | Kunz | ........................... | 714/38.1 |
| 7,702,958 B2 * | 4/2010 | Kwong et al. | ............... | 714/38.1 |
| 7,770,068 B2 * | 8/2010 | Drees | ............................. | 714/38 |
| 2004/0153837 A1 * | 8/2004 | Preston et al. | .................. | 714/39 |
| 2007/0168744 A1 * | 7/2007 | Pal et al. | .......................... | 714/38 |
| 2009/0019315 A1 * | 1/2009 | Belvin et al. | .................... | 714/38 |

FOREIGN PATENT DOCUMENTS

CN    1501265 A    6/2004

* cited by examiner

*Primary Examiner* — Scott T Baderman
*Assistant Examiner* — Joseph Schell
(74) *Attorney, Agent, or Firm* — Zhigang Ma

(57) ABSTRACT

A test system for testing various functions of electronic devices includes a master device and a simulation control device. The master device is connected to an input device and the electronic devices through the simulation control device. The master device records input signals of the input device and generate simulation signals according to the input signals. The simulation control device simulates the input signals of the input device according to the simulation signals to test the electronic devices.

13 Claims, 3 Drawing Sheets

TEST SYSTEM WITH SIMULATION CONTROL DEVICE FOR TESTING FUNCTIONS OF ELECTRONIC DEVICES

BACKGROUND

1. Technical Field

The present disclosure relates to test systems and test methods, and particularly to a test system and method for testing functions of electronic devices.

2. Description of Related Art

Most electronic devices are tested through manually and repeatedly operating input devices, such as mice and keyboards. However, manually repeating operations is time consuming, and may produce imprecise test results.

What is needed, therefore, is to provide a test system and a test method that can overcome the aforementioned deficiencies.

DETAILED DESCRIPTION

Figure 1:
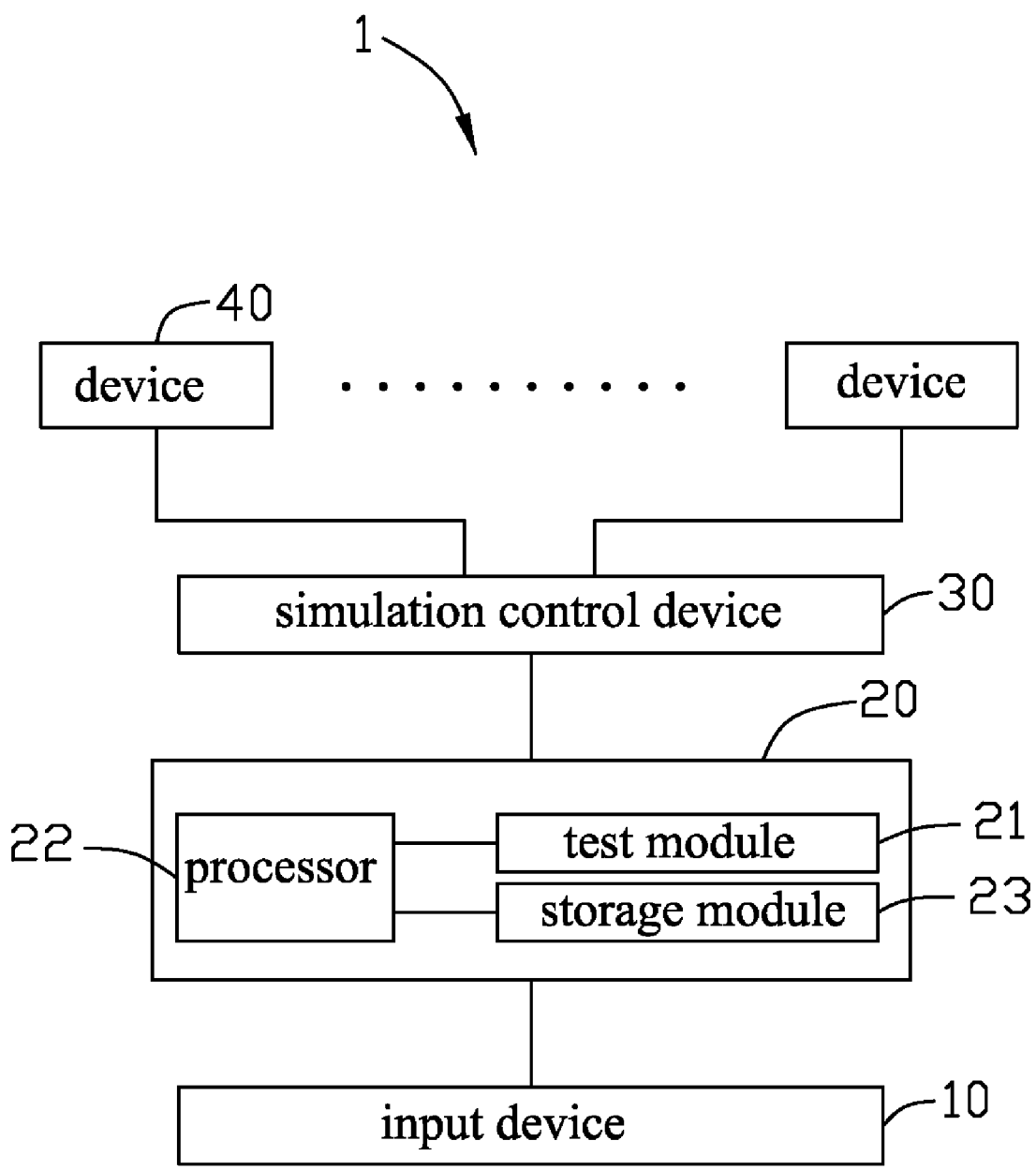
FIG. 1 is a block diagram of an exemplary embodiment of a test system for testing electronic devices, the test system including a simulator.

Referring to FIG. 1, an exemplary embodiment of a test system 1 for testing various functions of a plurality of electronic devices, such as an electronic device 40, may include an input device 10, a master device 20 connected to the input device 10, and a simulation control device 30 (hereinafter, "the simulator 30") connected between the master device 20 and the electronic device 40. The input device 10 is configured for inputting test signals for testing various functions of the master device 20, such as, a basic input output system (BIOS) function, hardware function, CPU function, display card function and so on. The master device 20 is configured for generating a test input template according to the test signals during the testing of a corresponding function of the master device 20. When the input device 10 is a keyboard, the test input template includes the test signals of the keyboard; when the input device 10 is a mouse, the test input template includes the test signals of the mouse; when the input device 10 is a keyboard and a mouse, the test input template includes the test signals of the keyboard and mouse. The simulator 30 is configured for simulating the test signals according to the test input template to test the corresponding function of the electronic device 40. Further details of the elements and the operation of the test system 1 will be explained in further detail below.

In one embodiment, the input device 10 may be a mouse and/or a keyboard, for example. The master device 20 and the electronic device 40 are the same electronic device, such as a server or a computer. The master device 20 includes a test module 21, a processor 22, and a storage module 23. In one embodiment, test software, such as Coplexer Record/Replay (CRR), is installed in the test module 21 for testing various functions of the master device 20 although other types of test software can also be used in the test module 21, such as 3DMark for testing display card function, and HD Tune for testing hardware function. Depending on the embodiment, the storage module 23 may be a hard disk drive, a random access memory, a read only memory, or some combination thereof, but the disclosure is not limited thereto. In one embodiment, the input device 10 is manually operated to input test signals for testing a corresponding function of the master device 20. During the testing of the corresponding function of the master device 20, the test module 21 records all test signals of the input device 10 to generate a test input template as simulation signals for the corresponding function, and then the test input template is stored in the storage module 23. The test module 21 may have a display function to display the test input template on a screen of the master device 20. Because the electronic device 40 and the master device 20 are the same device, after all desired functions of the master device 20 have been tested, the test input templates stored in the storage module 23 can be deemed as a template database for testing the desired functions of the electronic device 40. If it is desired to test additional functions of the master device 20, the test signals for the additional functions of the master device 20 are entered to the master device 20 through the input device 10, and the processor 22 controls the test module 21 to add new templates corresponding to the additional functions of the master device 20 to the storage module 23.

When it is need to test a BIOS function of the electronic device 40, an instruction may be inputted to the processor 22 through the input device 10. The processor 22 invokes a test input template for the BIOS function from the storage module 23, and then generates a controlling signal according to the test input template for the BIOS function. The controlling signal is configured for controlling the simulator 30 to simulate the test signals of the input device 10. For example, when the input device 10 is a keyboard, the test input template is just for the testing signals of the keyboard, the controlling signal may be the number "1", and the simulator 30 simulates the test signals of the keyboard; when the input device 10 is a mouse, the test input template is just for the testing signals of the mouse, the controlling signal may be the number "2", and the simulator 30 simulates the test signals of the mouse; when the input device 10 is a keyboard and a mouse, the test input template is for the testing signals of the keyboard and mouse, the controlling signal may be the number "3", and the simulator 30 simulates the test signals of the keyboard and mouse. The test input template for the BIOS function and the controlling signal are transmitted to the simulator 30. Accordingly, the simulator 30 simulates the test signals of the input device 10 for testing the BIOS function according to the test input template for the BIOS function to test the BIOS function of the electronic device 40. Thus, an operator does not need to manually repeat the operations of the input device 10 for the electronic device 40. It may be appreciated that a function of a plurality of electronic devices can be automatically and simultaneously tested through inputting an instrument by the input device 10, which may produce high efficiency and precise test results.

Figure 2:
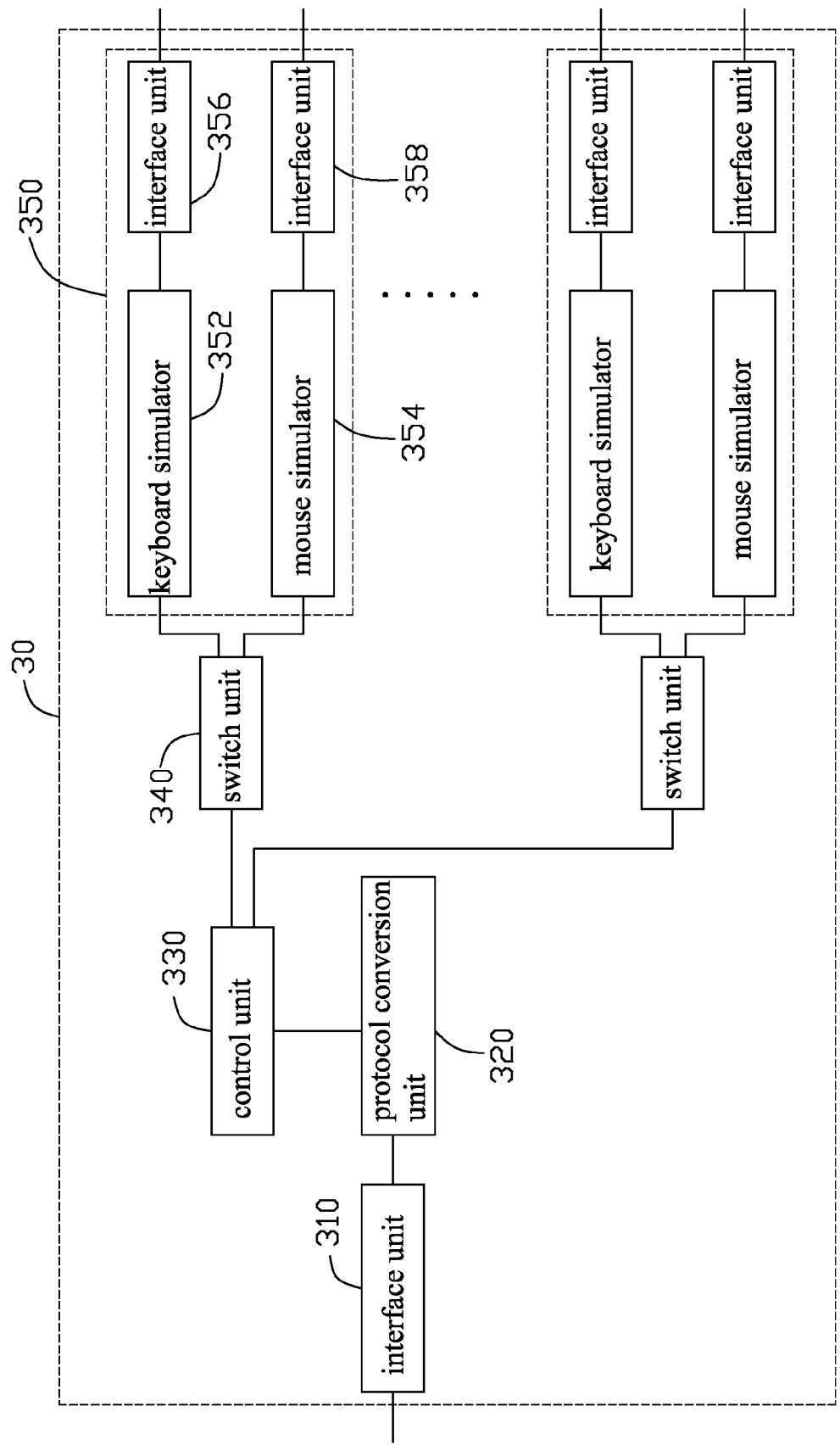
FIG. 2 is a block diagram of the simulation control device of FIG. 1.

Referring to FIG. 2, the simulator 30 may include a first interface unit 310 connected to the master device 20, a protocol conversion unit 320 connected to the first interface unit 310, a control unit 330 connected to the protocol conversion unit 320, a plurality of switch units 340 connected to the control unit 330, and a plurality of simulation output modules 350. Each simulation output module 350 is connected between one of the switch units 330 and the electronic devices 40. Each simulation output module 350 may include a keyboard simulator 352 connected to a corresponding switch unit 340, a mouse simulator 354 connected to the corresponding switch unit 340, a second interface unit 356 connected to the keyboard simulator 352, and a third interface unit 358 connected to the mouse simulator 354. In one embodiment, the second interface unit 356 may be a keyboard universal serial bus (USB) interface, and is connected to a keyboard USB interface of the electronic device 40. The third interface unit 358 may be a mouse USB interface, and is connected to a mouse USB interface of the electronic device 40.

The master device 20 electronically communicates with the protocol conversion unit 320 through the first interface unit 310. The protocol conversion unit 320 is configured for converting the test input template and the controlling signal from the processor 22 in the form of recognizable protocols, such as the Recommended Standard (RS) 232 communication protocol (e.g., converting the USB signals into RS-232 signals), for the control unit 330. The control unit 330 is configured for controlling the switch unit 340 to selectively electronically connect to the keyboard simulator 352 or the mouse simulator 354, or combination of the keyboard simulator 352 and the mouse simulator 354 according to the controlling signal from the processor 22. The control unit 330 is further configured for dividing the test input template into a first template that stores test signals from the mouse and a second template that stores test signals from the keyboard when the input device 10 is a keyboard and a mouse. For example, when the controlling signal is the number "1", the control device 30 controls the switch unit 340 to be electronically connected to the keyboard simulator 352 to transmit the second template to the keyboard simulator 352; when the controlling signal is the number "2", the control device 30 controls the switch unit 340 to be electronically connected to the mouse simulator 354 to transmit the first template to the mouse simulator 354; when the controlling signal is the number "3", the control device 30 controls the switch unit 340 to be electronically connected to the keyboard and mouse simulators 352 and 354 to transmit the first and second templates to the keyboard and mouse simulators 352 and 354 correspondingly. The keyboard simulator 352 is configured for simulating the test signals of the keyboard of the input device 10 according to the second template to test the electronic device 40. The mouse simulator 354 is configured for simulating the test signals of the mouse of the input device 10 according to the first template to test the electronic device 40.

Figure 3:
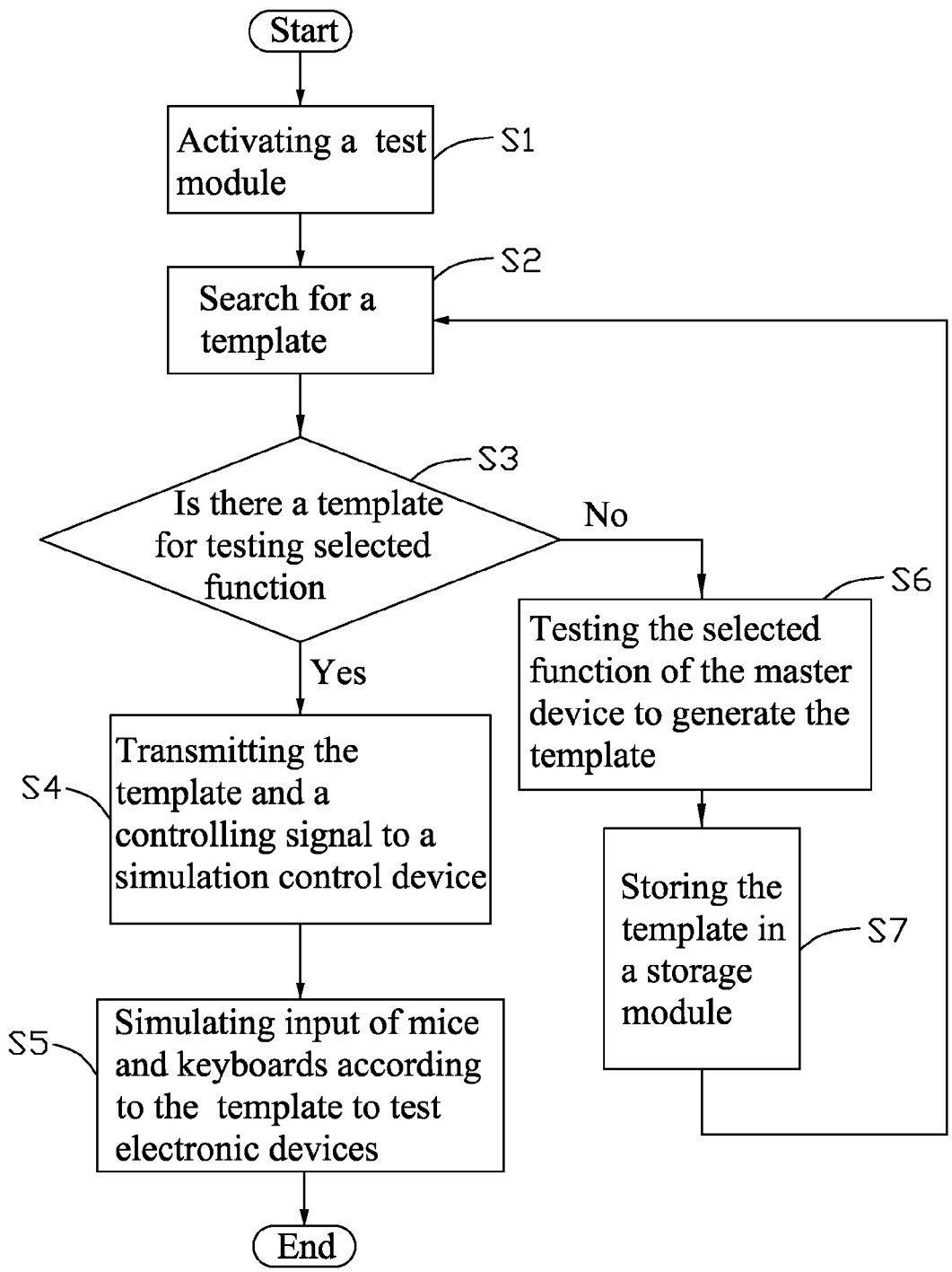
FIG. 3 is a flowchart of an exemplary embodiment of a test method for testing electronic devices.

Referring to FIG. 3, an embodiment of a test method may be used to simultaneously test one or more functions of one or more of the electronic device 40. In one embodiment, the test method is used for testing the BIOS function of the electronic device 40. Depending on the embodiment, additional blocks may be added, others deleted, and the ordering of the blocks may be changed.

In block S1, the test system 1 is initialized, and the test module 21 is activated.

In block S2, the input device 10 transmits an instruction to the processor 22. Accordingly, the processor 22 searches for the test input template for testing the BIOS function in the storage module 23 according to the instruction.

In block S3, the processor 22 determines if there is a test input template in the storage module 23 for testing the BIOS function. If there is a test input template in the storage module 23 for testing the BIOS function, the procedure continues to block S4, otherwise, the procedure goes to block S6.

In block S4, the processor 22 invokes the test input template for testing the BIOS function and generates a controlling signal according to the test input template. For example, the controlling signal is the number "1" when the input device 10 is a keyboard. Additionally, the test input template and the controlling signal are transmitted to the protocol conversion unit 320 through the first interface unit 30.

In block S5, after the protocol conversion unit 320 converts the test input template and the controlling signal in the form of recognizable protocols, the control device 330 controls the switch unit 340 to be selectively connected to the keyboard simulator 352 and the mouse simulator 354. For example, when he controlling signal is the number "1", the switch unit 340 is connected to the keyboard simulator 352 to send the second template to the keyboard simulator 352, and then the keyboard simulator 35 simulates the test signals of the keyboard of the input device 10 to test the BIOS function of the electronic device 40. In this situation, the mouse simulator 354 does not work.

In block S6, the processor 22 generates an alerting signal on a screen of the master device 20 to indicate there is no a test input template for testing the BIOS function in the storage module 23. In this situation, it is needed to input test signals for testing the BIOS function of the master device 20 by the input device 10. According, the processor 22 controls the test module 21 to tests the BIOS function of the master device 20 to generate the test input template for the BIOS function.

In block S7, the processor 21 controls the test input template for the BIOS function to be stored in the storage module 23, and the procedure returns to the block S2.

The foregoing description of the certain inventive embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skill in the art to which the present disclosure pertains without departing from its spirit and scope. Accordingly, the scope of the present disclosure is defined by the appended claims rather than the foregoing description and the embodiments described therein.

What is claimed is:

1. A test system for testing a plurality of functions of a plurality of electronic devices, the test system comprising:
    an input device for inputting test signals for testing a plurality of functions of the plurality of electronic devices and test instructions for testing the plurality of functions of a master device, the master device comprising:
        a test module for testing the plurality of functions of the master device according to the test instructions from the input device, and for generating simulation signals indicative of the test instructions after testing the plurality of functions of the master device;
        a storage module for storing the simulation signals generated by the test module; and
        a processor for searching the storage module for the simulation signals according to the test signals in order to test the plurality of functions of the plurality of electronic devices;
    and
    a simulation control device for simulating the test signals from the input device according to the simulation signals found by the processor to test the plurality of functions of the plurality of electronic devices.

2. The test system of claim 1, wherein the simulation control device comprises:
    a first interface unit configured for receiving the simulation signals from the processor;

a control unit configured for controlling one or more simulation output modules connected to a respective one or more of the plurality of electronic device; and a protocol conversion unit electronically positioned between the first interface unit and the control unit, the protocol conversion unit configured for converting the received simulation signals in the form of recognizable protocols for the control unit;

wherein the control unit is capable of using the received simulation signals to control the one or more simulation output modules to test the plurality of functions of the plurality of electronic devices.

3. The test system of claim 2, wherein the one or more simulation output modules each comprise a first simulator and a second simulator, wherein each of the first simulators and each of the second simulators are configured for testing the plurality of functions of the plurality of electronic devices according to the received simulation signals.

4. The test system of claim 3, further comprising one or more switch units, each of the one or more switch units electronically connected between the control unit and a respective one of the one or more simulation output modules, wherein the one or more switch units are configured to control operation of each of the first simulators and each of the second simulators according to the received simulation signals.

5. The test system of claim 4, further comprising at least one second interface unit electronically connected between one of the one or more simulation output modules and one of the plurality of electronic devices.

6. The test system of claim 5, wherein the one or more simulation output modules is a keyboard simulator for simulating test signals of a keyboard according to the received simulation signals to test the function to test of the plurality of electronic devices.

7. The test system of claim 5, wherein the one or more simulation output modules is a mouse simulator for simulating test signals of a mouse according to the received simulation signals to test the function to test of the plurality of electronic devices.

8. The test system of claim 5, wherein the at least one second interface unit is a Universal Serial Bus interface.

9. The test system of claim 1, wherein the master device and the electronic device are servers or computers.

10. A test method applied to a test system for testing a plurality of functions of an electronic device, the test method comprising:
    providing the test system comprising:
        an input device;
        a master device comprising a test module, a storage module, and a processor;
        a first interface unit;
        a control unit;
        a protocol conversion unit; and
        one or more simulation output modules connected to the electronic device;
    inputting test signals for testing the plurality of functions of the electronic device and test instructions for testing the plurality of functions of the master device through the input device;
    testing the plurality of functions of the master device according to the test instructions from the input device, and generating simulation signals indicative of the test instructions after testing the plurality of functions of the master device through the test module;
    storing the simulation signals generated by the test module in the storage module;
    searching the simulation signals in the storage module for a function of the electronic device to test according to a test signal inputted by the input device;
    invoking the simulation signals for the function in the storage module through the processor in response to the simulation signals for the function being stored in the storage module;
    transmitting the invoked simulation signals to the protocol conversion unit through the first interface unit;
    converting the invoked simulation signals in the form of the recognizable protocols for the control device through the protocol conversion unit; and
    controlling the one or more simulation output modules based on the invoked simulation signals to test the plurality of functions.

11. The test method of claim 10, further comprising controlling a switch unit that is electronically connected between a mouse simulator and the control unit based on the invoked simulation signals in response to that input device being a mouse.

12. The test method of claim 10, further comprising controlling a switch unit that is electronically connected between a keyboard simulator and the control unit based on the invoked simulation signals in response to that input device being a keyboard.

13. The test method of claim 10, wherein after the searching step, the test method further comprises:
    generating an alert signal through the processor in response to there being no simulation signals for the function in the storage module;
    generating simulation signals indicative of a test instruction inputted by the input device; and
    storing the simulation signals for the function in the storage module and returning to the searching step.

* * * * *